United States Patent
Panwar et al.

(10) Patent No.: US 12,389,292 B2
(45) Date of Patent: Aug. 12, 2025

(54) HANDOVER WITH LOW LATENCY IN RESPONSE TO BLOCKAGES IN A WIRELESS NETWORK

(71) Applicant: New York University, New York, NY (US)

(72) Inventors: Shivendra S. Panwar, Freehold, NJ (US); Athanasios Koutsaftis, Brooklyn, NY (US); Fraida Fund, Highland Park, NJ (US)

(73) Assignee: New York University, New York, NY (US)

( * ) Notice: Subject to any disclaimer, the term of this patent is extended or adjusted under 35 U.S.C. 154(b) by 418 days.

(21) Appl. No.: 18/119,791

(22) Filed: Mar. 9, 2023

(65) Prior Publication Data

US 2023/0292199 A1     Sep. 14, 2023

Related U.S. Application Data

(60) Provisional application No. 63/318,679, filed on Mar. 10, 2022.

(51) Int. Cl.
*H04W 36/00*     (2009.01)
*H04W 36/02*     (2009.01)

(52) U.S. Cl.
CPC ....... *H04W 36/02* (2013.01); *H04W 36/0061* (2013.01); *H04W 36/0069* (2018.08)

(58) Field of Classification Search
None
See application file for complete search history.

(56) References Cited

U.S. PATENT DOCUMENTS

| | | | | |
|---|---|---|---|---|
| 10,560,955 | B2 * | 2/2020 | Shoshan | H04W 72/04 |
| 2014/0133383 | A1 * | 5/2014 | Park | H04W 72/30 |
| | | | | 370/312 |
| 2015/0049760 | A1 * | 2/2015 | Xu | H04L 45/16 |
| | | | | 370/390 |
| 2015/0195032 | A1 * | 7/2015 | Sharma | H04B 7/15592 |
| | | | | 370/315 |
| 2020/0305068 | A1 * | 9/2020 | Ratnam | H04W 48/16 |
| 2022/0132440 | A1 * | 4/2022 | Newman | G01S 5/0054 |
| 2023/0081145 | A1 * | 3/2023 | Godin | H04L 12/185 |
| | | | | 370/312 |

* cited by examiner

*Primary Examiner* — Brandon M Renner
(74) *Attorney, Agent, or Firm* — John C. Pokotylo; Pokotylo Patent Services

(57) ABSTRACT

To address challenges in existing 5G wireless networks, a new wireless backhaul scheme, referred to as Fast Wireless Backhaul (FWB), is described. More specifically, in order to reduce handover delays in a network including a gateway device, at least two base stations, and a user equipment device, one of a group of the base stations selected is identified as a primary base station, and each of the other of the group of base stations selected is identified as a secondary base station. A control plane wireless connection is maintained between the user equipment device and each of the preferred base stations selected. A data plane wireless connection is maintained only between the user equipment device and the primary base station.

20 Claims, 10 Drawing Sheets

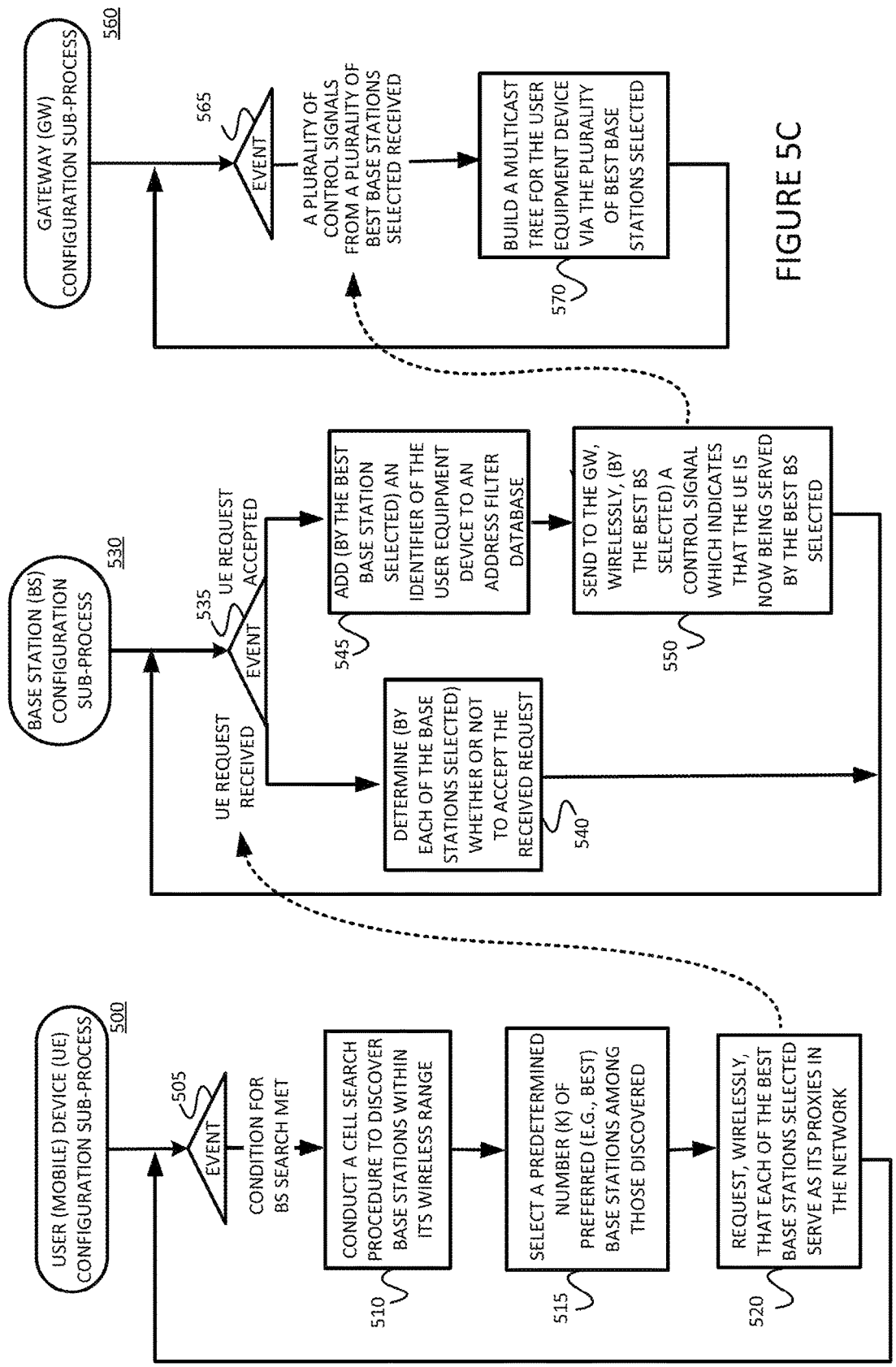

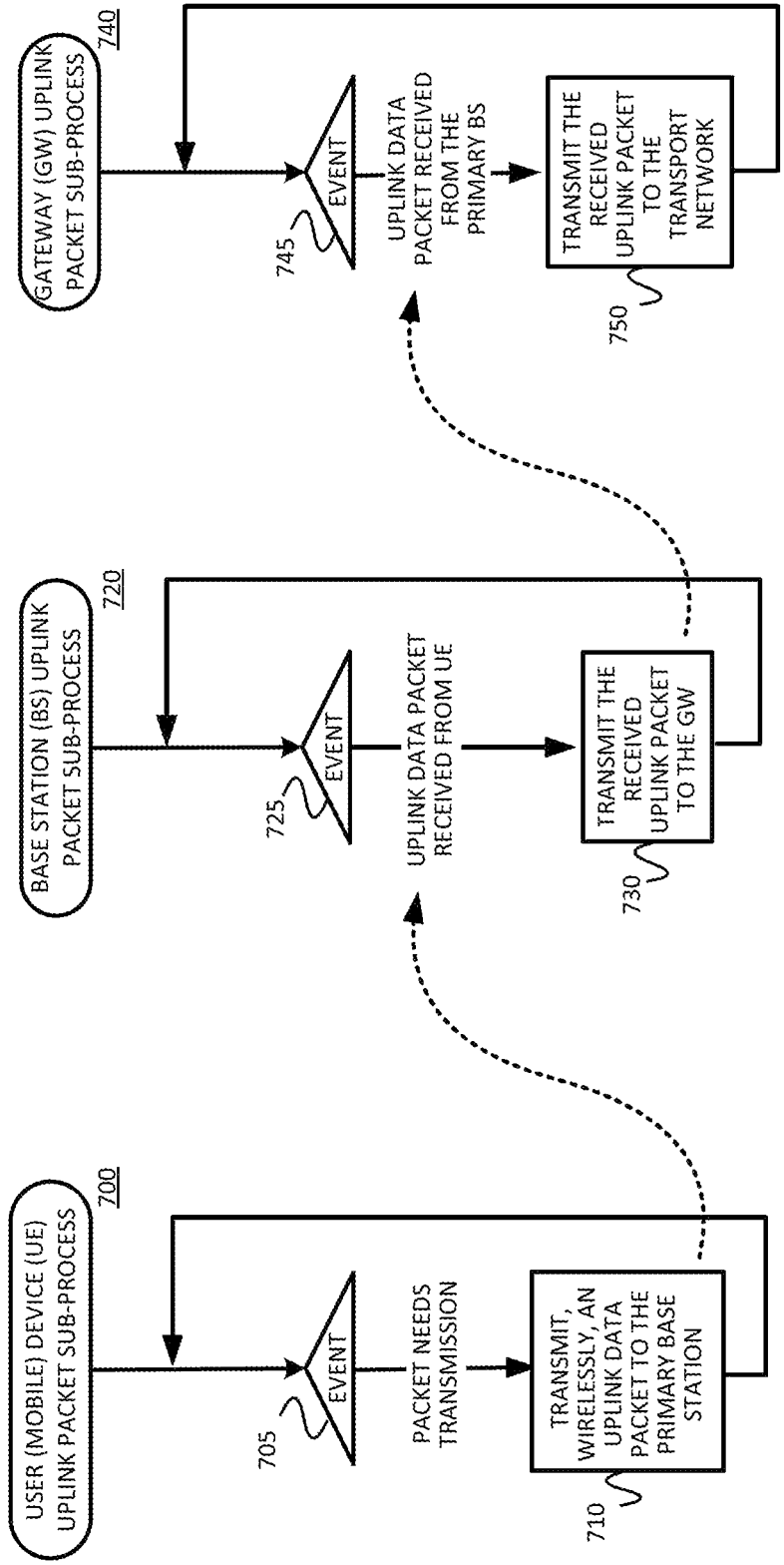

HANDOVER WITH LOW LATENCY IN RESPONSE TO BLOCKAGES IN A WIRELESS NETWORK

§ 0. RELATED APPLICATION(S)

This application claims the benefit of U.S. Provisional Patent Application Ser. No. 63/318,679 (referred to as "the '679 provisional" and incorporated herein by reference), filed on Mar. 10, 2022, titled "FAST WIRELESS BACKHAUL," and listing Shivendra S. PANWAR, Athanasios KOUTSAFTIS, and Fraida FUND as the inventors. The present invention is not limited to requirements of the particular embodiments described in the '679 provisional.

§ 1. BACKGROUND

§ 1.1 Field of the Invention

The present description concerns mobile communications. In particular, the present description concerns providing improved handover with low latency in response to blockages, especially in mm Wave and/or Terahertz cellular networks, or any blockage-driven cellular networks resulting in frequent handovers (e.g., 5G networks).

§ 1.2 Background Information

The discussion of any technical subject matter in this section is not an admission that such technical subject matter is prior art. Further, the discussion of different technical subject matter in this section is not an admission that it would have been obvious to combine such different technical subject matter.

Fifth generation (5G) and third generation partnership project (3GPP) background information is provided in U.S. patent application Ser. No. 17/085,260, titled "FAST INTER-BASE STATION RING (FIBR): NEW MILLIMETER WAVE CELLULAR NETWORK ARCHITECTURES AND PROCESSES," filed on Oct. 30, 2020, and listing Athanasios Koutsaftis, Rajeev Kumar, Pei Liu, and Shivendra S. Panwar as the inventors (referred to as "the '260 application" and incorporated herein by reference).

5G mmWave and next-generation cellular networks are expected to meet the Quality-of-Service (QoS) requirements of different applications and services. These applications may impose significant challenges on the networks in terms of throughput, latency, reliability, or a combination of the foregoing. Although mmWave and Terahertz links can achieve extremely high data rates, they are highly intermittent because they suffer from severe path and penetration losses.

One way to improve the performance of these cellular networks is network densification, whereby the inter-site distance is reduced to establish stronger and more reliable channels. Unfortunately, however, an ultra-dense deployment implies high capital and operational cost for network operators, as high capacity fiber-like backhaul connections need to be provided to a higher number of cellular base stations (BSs) as compared to networks that operate at lower frequencies.

To reduce the capital and operational cost of the cellular BS deployment, the 3GPP has proposed centralization of a few functions for the next generation NodeB (gNB), as the complexity of the individual BSs is reduced. Moreover, wireless backhaul infrastructure as a cost-efficient alternative to the traditional wired backhaul has been researched.

The combination of function centralization and wireless backhaul has led to the design of the Integrated Access and Backhaul (IAB) technique. In an IAB framework, a few of the gNBs transmit the backhaul traffic over mmWave links, possibly through multiple hops and the rest of the gNBs are connected to the Core Network (CN) over fiber.

FIG. 1 is an example network environment 100 in which example embodiments consistent with the present description may be implemented. As shown, the example network environment 100 includes at least one user equipment device (UE) 110, a plurality of base stations 130a-130c, at least one gateway device 140 and a core (transport) network(s) 150. In this example, the gateway device 140 and the base stations 130a-130c belong to a wireless backhaul network 120. Further, the user equipment 110 is within the range 160 of both base station 1 130a and base station 2 130b. The gateway device 140 peers with one or more devices (not shown) of the core transport network(s) 150.

Although wireless backhauling is a promising solution to decrease deployment cost of the network, meeting the low latency and high reliability requirements of next-generation applications remains challenging. The network densification in conjunction with highly intermittent mmWave and Terahertz links necessitates frequent handovers (e.g., 0.1-1 handovers/sec) to maintain connectivity even in networks with wired backhaul. In a setting with wireless backhauling, the wireless backhaul links are also vulnerable to blockage (e.g., due to moving objects, seasonal changes, due to infrastructure changes, etc.). This causes further topology adaptation and more handovers.

Since the 3GPP architecture is connection-oriented, in which a connection is set up and torn down during every handover procedure, meeting the latency and reliability requirements can be extremely difficult. This is especially true in a wireless backhaul framework. More specifically, referring to FIG. 2, in the conventional 3GPP, measurement control and reports 210 are maintained between UE 110a and master base station gNB-DU 130a. Assume that a beam failure is detected by the UE 110. (Block 220) Communication 230 is a master cell group (MCG) (i.e., the group of cell carriers associated with the master gNB-DU 130a) link. If the communication is lost, the UE 110 can no longer communicate with the master gNB-DU 130a. This can be thought of as a communication channel; if it's strength and/or quality falls below a threshold for a specific amount of time, it is perceived to be gone. Recall that the UE 110 periodically sends measurement reports 210 to the master 130a regarding signal strength with all neighboring gNB-DUs 130. When the connection between the UE 110 and master gNB-DU 130a is lost, the master gNB-DU 130a checks the last received measurement report from the UE 110 and chooses the best gNB-DU (e.g., in terms of best signal strength) for that UE 110. Assume in this example that the secondary gNB-DU 130b is chosen as the best for the UE 110. The master base station gNB-DU 130a then makes a decision to change the master for the UE 110. (Block 240) Responsive to this change decision, the master base station gNB-DU 130a sends a change request 250 to a secondary base station gNB-DU 130b (which was previously chosen as the best for the UE 110). After this changeover occurs, downlink user data 260 from the core network (CN) 150 is sent to the UE 110 via the secondary base station gNB-DU 130b, which acts as the new master base station for the UE 110. The UE 110 continues to maintain measurement control and reports 270, and performs gNB-DU discovery 280. The UE 110 and (former) master gNB-DU also perform radio resource control (RRC) configuration and random access channel (RACH) 290. As can be appreciated from the foregoing, if the wireless connection between the UE 110 and the primary BS 130a is compromised (e.g., due to either blockage or UE roaming), the UE 110 cannot quickly change over to communication to and from the core network CN 150 via a new master base station 130b. Therefore, an efficient scheme to address the control plane latency in a blockage-driven cellular network with wireless backhauling capability is needed.

§ 2. SUMMARY OF THE INVENTION

To address the challenges discussed above, a new wireless backhaul scheme, referred to as Fast Wireless Backhaul (FWB), is described. More specifically, in order to reduce handover delays in a network including a gateway device, at least two base stations, and a user equipment device, a method is provided, the method comprising: (a) conducting, by the user equipment device, a cell search procedure to discover base stations within its wireless range; (b) selecting, by the user equipment device, a predetermined number (K) of preferred base stations among those discovered; (c) requesting wirelessly, by the user equipment device, that each of the K preferred base stations selected serve as its proxies in the network; (d) responsive to receiving a request from the user equipment device, determining, by each of the K preferred base stations selected, whether or not to accept the received request; (e) for each of the K preferred base stations selected, responsive to accepting the received request, (1) adding, by the preferred base station selected, an identifier of the user equipment device to an address filter database, and (2) sending to the gateway device wirelessly, by the preferred base station selected, a control signal which indicates that the user equipment device is now being served by the preferred base station selected; and (f) responsive to receiving a plurality of control signals from a plurality of the preferred base stations selected, building a multicast tree for the user equipment device via the plurality of preferred base stations selected.

In at least some of these example methods, one of the preferred base stations selected is identified as a primary base station, and each of the other of the preferred base stations selected is identified as a secondary base station. In this case, the example method further includes: maintaining a control plane wireless connection between the user equipment device and each of the preferred base stations selected; and maintaining a data plane wireless connection only between the user equipment device and the primary base station.

In the case of processing a downlink data packet, the example method may further include: receiving, by the gateway device, a downlink data packet destined for the user equipment device; responsive to receiving the downlink data packet destined for the user equipment device (1) multicasting the downlink data packet towards the user equipment device via the multicast tree, (2) buffering the downlink data packet, and (3) starting a timer or counter; for each of the preferred base stations selected, responsive to receiving from the gateway device, the downlink data packet destined for the user equipment device, determining whether or not the preferred base station selected is the primary base station; responsive to a determination that the preferred base station selected is the primary base station, sending the downlink data packet received to the user equipment device wirelessly, and otherwise, responsive to a determination that the preferred base station selected is not the primary base station, storing the downlink data packet received in a downlink bearer buffer; receiving, by the user equipment device, the downlink data packet from the primary base station; and responsive to receiving the downlink data packet from the primary base station, sending wirelessly, by the user equipment device, a receipt acknowledgement to the primary base station. The example method may further include: responsive to receiving, by the primary base station, the receipt acknowledgement from the user equipment device, sending, by the primary base station, a second receipt acknowledgement to the gateway device; determining, by the gateway device, whether or not the second receipt acknowledgement is received from the primary base station within a predetermined time period from the time the gateway device multicast the downlink data packet; and responsive to determining that the second receipt acknowledgment was received from the primary base station within the predetermined time period from the time the gateway device multicast the downlink data packet, (1) removing, by the gateway device, the downlink data packet from its buffer (or marking the downlink data packet for removal from its buffer, or marking the buffer location storing the downlink data packet for overwrite), and (2) multicasting, by the gateway device, a further acknowledgement to at least the secondary base stations, and otherwise, responsive to determining that the second receipt acknowledgement was not received from the primary base station within the predetermined time period from the time the gateway device multicast the downlink data packet, re-multicasting the downlink data packet towards the user equipment device via the multicast tree. The example method may further include for each of the secondary base stations, responsive to receiving the further acknowledgement from the gateway device, removing, by the secondary base station, the downlink data packet from its downlink bearer buffer.

In the case of performing handover of a UE from one BS to another BS, the example method may further include: determining, by the user equipment device, whether or not is has control plane connection with at least the predetermined number of base stations; and responsive to a determination that the user equipment device does not have control plane connection with at least the predetermined number of base stations, (1) selecting, by the user equipment device, another of the preferred base stations from among those discovered, and (2) requesting, by the user equipment device, the other base station selected to serve as its proxy in the network.

In the case of performing handover of a UE from one BS to another BS, the example method may further include: determining, by the user equipment device, that a wireless connection with the primary base station is down; and responsive to determining that the wireless connection with the primary base station is down, requesting wirelessly, by the user equipment device, that one of the secondary base stations become a new primary base station.

In the case of processing an uplink data packet, the example method may further include: transmitting wirelessly, from the user equipment device, an uplink data packet to the primary base station; receiving, by the primary base station, the uplink data packet; responsive to receiving, by the primary base station, the uplink data packet, transmitting the uplink data packet to the gateway device; receiving, by the gateway device, the uplink data packet; and responsive to receiving, by the gateway device, the uplink data packet, transmitting the uplink data packet to a transport network.

Systems and apparatus (e.g., UEs, BSs, and GWs) for implementing some parts of, or all of, the foregoing example methods are also provided.

In some implementations, each of the at least two base stations are wirelessly connected with one another.

In some implementations, at least one of the base stations is wirelessly connected with the gateway device.

§ 3. BRIEF DESCRIPTION OF THE DRAWINGS

FIGS. 5A-5C are flow diagrams of example configuration sub-methods that may be performed by user equipment, by each of a plurality of base stations, and by a gateway device, respectively, consistent with the present description.

FIGS. 7A-7C are flow diagrams of example sub-methods for uplink packet processing that may be performed by user equipment, by each of a plurality of base stations, and by a gateway device, respectively, consistent with the present description.

§ 4. DETAILED DESCRIPTION

The present disclosure may involve novel methods, apparatus, message formats, and/or data structures for providing an efficient scheme to address control plane latency in a blockage-driven cellular network with wireless backhauling capability. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

Example embodiments consistent with the present description provide a new wireless backhaul scheme (referred to as "fast wireless backhaul" or "FWB") which solves inherent drawbacks of the legacy backhaul networks in mmWave band, while minimizing the deployment cost. With an example FWB architecture, a group of BSs in close proximity are grouped together in a mesh topology and are connected to the core network via the FWB gateway (FWB-GW). That is, Integrated Access and Backhaul (IAB) may use a backhaul has a partially connected mesh topology. The aggregated coverage area for all BSs with the same FWB-GW may be referred to as a "FWB area." In this scheme, each UE is not associated with a single BS, but instead with the parent FWB Gateway (FWB-GW). The operation of the network is as follows.

§ 4.1 Example Network Environment and Overview of Example Methods

Figure 1:
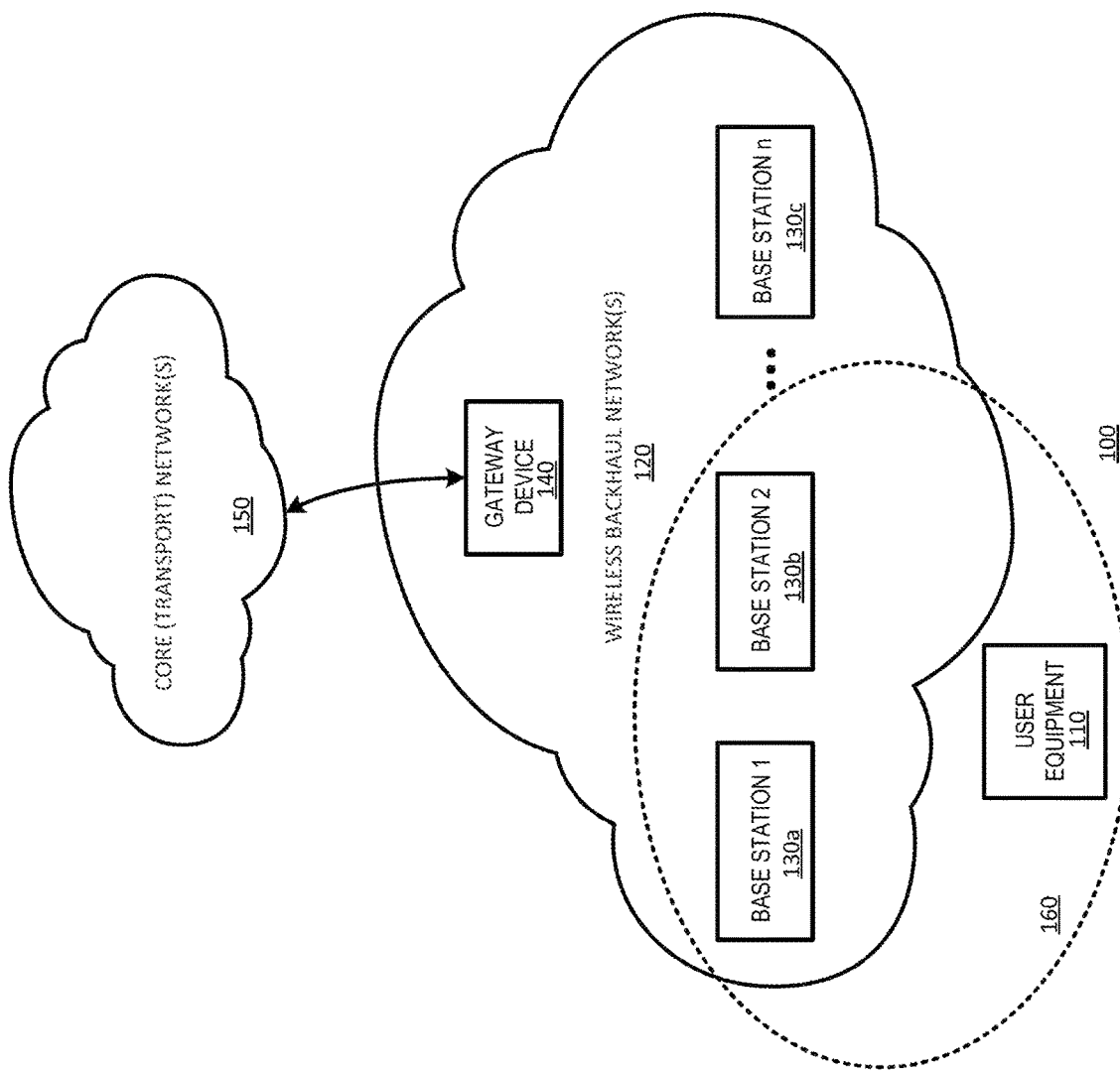
FIG. 1 is an example network environment 100 in which example embodiments consistent with the present description may be implemented.

FIG. 1, already introduced above, illustrates an example environment 100 in which example embodiments consistent with the present description may be used.

Figure 4C:
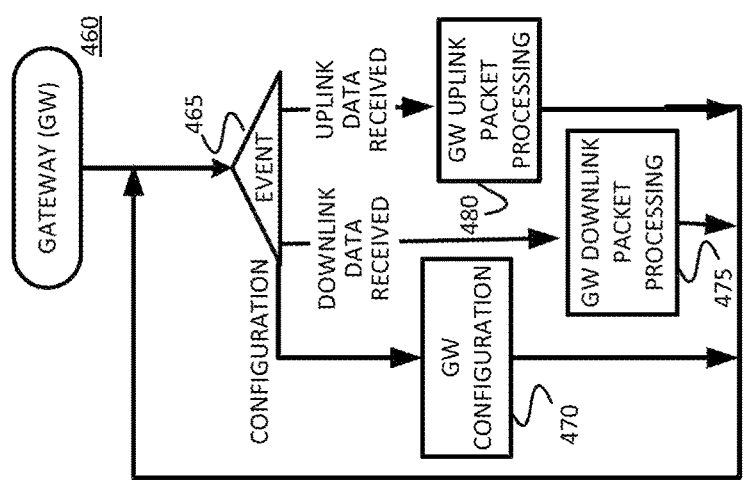
FIGS. 4A-4C are flow diagrams of example methods that may be performed by user equipment, by each of a plurality of base stations, and by a gateway device, respectively, consistent with the present description.
Figure 4B:
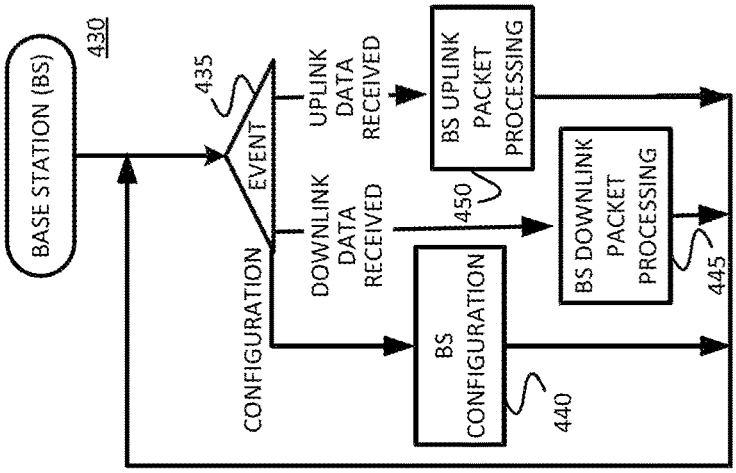
Figure 4A:
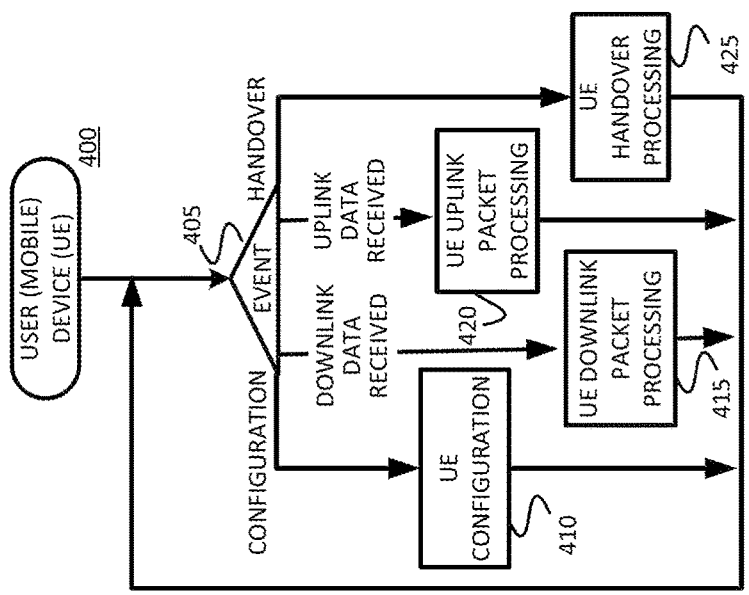

FIGS. 4A-4C are flow diagrams of example methods 400, 430 and 460, respectively, that may be performed by user equipment UE, by each of a plurality of base stations BSs, and by a gateway device GW, respectively, consistent with the present description. Responsive to a condition(s) for configuration being met (left-most branch of Events 405, 435, 465), UE configuration operations 410, BS configuration operations 440 and GW configuration operations 470, respectively, are performed. Details of example implementations of these operations 410, 440, and 470 are described with reference to FIGS. 5A, 5B and 5C, respectively, in § 4.2 below.

Responsive to the receipt of downlink (that is, to the UE) data (second left-most branch in Events 405, 435, 465), UE downlink packet processing 415, BS downlink packet processing 445 and GW downlink packet processing 475, respectively, are performed. Details of example implementations of these processes 415, 445, and 475 are described with reference to FIGS. 6A, 6B and 6C, respectively, in § 4.3 below.

Responsive to the receipt of uplink (that is, from the UE) data (second right-most branch in Event 405, and right-most branches in Events 435 and 465), UE uplink packet processing 420, BS uplink packet processing 450 and GW uplink packet processing 480, respectively, are performed. Details of example implementations of these processes 420, 450, and 480 are described with reference to FIGS. 7A, 7B and 7C, respectively, in § 4.4 below.

Finally, referring to FIG. 4A, responsive to the occurrence of a handover condition(s) being met (right-most branch of Event 405), the example method 400 performs UE handover processing 425. Details of an example of this processing 425 is described with reference to FIG. 8 in § 4.6 below.

§ 4.2 Initial Access

When a UE enters the FWB area, it conducts a cell search procedure to find BSs in its communication range. In a K-connectivity model (i.e., in a model in which the UE can have a connection with up to K BSs), the UE selects the K best available BSs and requests that these BSs serve as its proxies in the FWB network.

Once the BSs accept the request, they add the UE's ID to their Address Filter Database (AFD). At the same time, each of the BSs that accept the UE's request sends a control signal to the FWB-GW to indicate that the UE is now being served by that BS.

The FWB-GW uses the control signals from the BSs to build the multicast tree (via the BSs) for the UE.

FIGS. 5A-5C are flow diagrams of example configuration methods 500, 530, and 560 that may be performed by user equipment, by each of a plurality of base stations, and by a gateway device, respectively, consistent with the present description. Referring first to FIG. 5A, responsive to a trigger event (e.g., a timer expiration) for conducting a base station search (Event 505), the example method 500 conducts a cell search procedure to discover base stations within the wireless range of the UE. (Block 510) The example method 500 then selects a predetermined number (K) of preferred (e.g., best) base stations among those discovered. (Block 515. Finally, the example method 500 requests, wirelessly, that each of the best base stations selected serve as the UE's proxies in the network. (Block 520)

Referring to FIG. 5B, for each of the K "best" base stations that receive the UE request (left branch of Event 535), the base station determines whether or not to accept the received request. (Block 540) If it is determined to accept the UE request (right branch of Event 535), the example method 530 then adds an identifier of the user equipment device to an address filter database (Block 545), and sends to the gateway device, wirelessly, a control signal which indicates that the user equipment device is now being served by the best base station selected (Block 550). Note that the method 530 of FIG. 5B will be performed by each of the base stations, and in particular, the K best base stations that receive the UE request.

Referring to FIG. 5C, responsive to receiving a plurality of control signals from a plurality of best base stations selected (Event 565), the example method 560 builds a multicast tree for the user equipment device via the plurality of best base stations selected. (Block 570)

In at least some embodiments of the example methods 500 and 530, one of the best base stations selected is identified as a "primary" base station, and the reminder of the best base station(s) selected are identified as "secondary" base station(s). In such example embodiments, a control plane wireless connection is maintained between the user equipment device and each of the base stations selected, and a data plane wireless (e.g., upstream and downstream) connection is maintained only between the user equipment device and the primary base station.

§ 4.2.1 Multi-Connectivity

If a UE is capable of multi-connectivity, it maintains connectivity with multiple BSs. However only a single BS (referred to as the "primary BS") transmits data to the UE. The primary BS might be selected based on having the best signal quality out of the available ones (using, e.g., the Reference Signal Receive Power (RSRP) indicator). The connectivity with the other BSs (referred to as "secondary BSs") is maintained using heartbeat signals with configured periodicity. This permits fast and efficient switching (i.e., handover) in case of data plane connection disruption.

§ 4.3 Downlink Traffic

When a new downlink packet arrives at the FWB-GW, the FWB-GW multicasts the new downlink packet to all BSs that have a connection with the UE in the FWB area.

When the downlink packet arrives at each destined B S, the BS checks if it has a data plane connection with the UE. That is, the BS determines whether or not it is the primary BS for the given UE. If the BS does not have a data plane connection with the UE (that is, if the BS is a secondary BS), it will store the packet at its downlink bearer buffer. This enables data transmission to be recovered immediately in the event that the UE connection to the primary BS fails. Otherwise, the primary BS sends the packet to the UE over-the-air without delay and/or without further condition (e.g., at the first transmission opportunity). Once the BS transmits the packet and receives an acknowledgement from the UE, it sends the acknowledgement to the FWB-GW.

In response to receiving the acknowledgement, the FWB-GW will then remove the packet from its packet data convergence protocol ("PDCP") buffer. Moreover, the FWB-GW multicasts the acknowledgement so that the secondary BSs will know that it is safe to remove the corresponding downlink packet from their respective downlink buffers. If, on the other hand, the packet is not acknowledged after a predetermined number of (e.g., 4) time slots (e.g., with a slot duration of 125 µs), the FWB-GW broadcasts the packet again. If an acknowledgement is not received after another predetermined number of (e.g., 4) timeslots, the FWB-GW assumes that an Radio Link Failure (RLF) occurred to the UE. The FWB-GW then multicasts a control message indicating this event. In response, all BSs that are associated with the UE (e.g., as a primary BS or as a secondary BS) remove the UE ID from their AFD and remove all UE-related stored (i.e., buffered) traffic.

That is, during acknowledgement, the UE receives the downlink packet and responds with an acknowledgement to the primary BS. Then, the primary BS forwards this acknowledgement to its parent in the multicast tree. Each node in the tree forwards the packet to its parent until it reaches the FWB-GW. After the acknowledgement is received, the FWB-GW removes the acknowledged packets from its buffer. The FWB-GW then "piggybacks" this acknowledgement with the next-in-line packets and distributes the next-in-line packets throughout the multicast tree. Each associated BS will flush the packets from their respective downlink buffers according to the received acknowledgement.

Figures 6A, 6B, 6C:
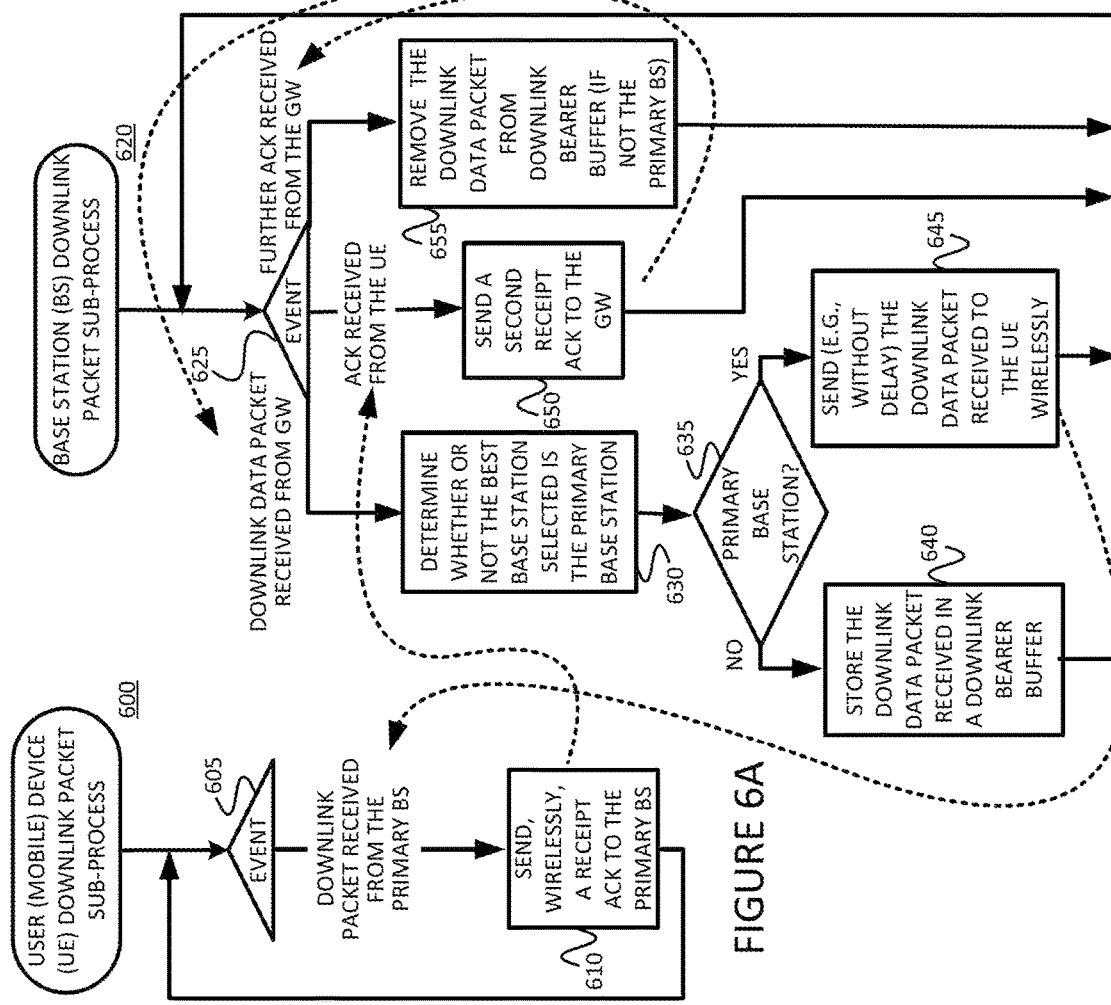
FIGS. 6A-6C are flow diagrams of example sub-methods for downlink packet processing that may be performed by user equipment, by each of a plurality of base stations, and by a gateway device, respectively, consistent with the present description.

FIGS. 6A-6C are flow diagrams of example methods 600, 620, and 660 for downlink packet processing that may be performed by user equipment (UE), by each of a plurality of base stations (BSs), and by a gateway device (GW), respectively, consistent with the present description. Referring to FIG. 6B, each of the branches of the example method 620 may be performed responsive to the occurrence of different events. Similarly, referring to FIG. 6C, each of the branches of the example method 660 may be performed in response to the occurrence of different events.

Referring first to FIG. 6C, assume that the GW receives a downlink data packet destined for the UE. Referring to the left-most branch of Event 665 of the example method 660, responsive to receiving the downlink data packet destined for the UE, the example method 660 (1) multicasts the downlink data packet towards the UE via the multicast tree (Block 670) (Recall, e.g., block 570 of FIG. 5C), (2) buffers the downlink data packet (Block 675), and (3) starts a timer or counter (Block 680), before the example method 660 branches back to Event 665.

Referring next to FIG. 6B, assume that the multicast downlink packet is received by multiple base stations. Referring to the left-most branch of Event 625 of FIG. 6B, for relevant BSs, responsive to receiving from the GW, the downlink data packet destined for the UE, the example method 620 determines whether or not the BS is the primary base station. (Block 630) Responsive to a determination that the BS is the primary base station (Decision 635=YES), the example method 620 sends (e.g., without delay and/or without condition) to the UE wirelessly, the downlink data packet received. (Block 645) If, on the other hand, it is determined that the BS is not the primary base station (Decision 635=NO), the example method 620 stores the downlink data packet received in a downlink bearer buffer. (Block 645)

Referring next to FIG. 6A, assume that the UE receives the downlink data packet from the primary BS. Responsive to receiving the downlink data packet from the primary BS (Event 605), the example method 600 sends, wirelessly, a receipt acknowledgement to the primary BS. (Block 610)

Referring back to FIG. 6B, assume that the primary BS receives the receipt acknowledgement from the UE. (Middle branch of Event 625) Responsive to receiving, by the primary BS, the receipt acknowledgement from the UE, the example method 620, sends a second receipt acknowledgement to the GW. (Block 650) Referring back to FIG. 6C, assume that the GW receives the second receipt acknowledgment. (Right branch of Event 665) Responsive to determining that the second receipt acknowledgment was received from the primary BS (before expiration of the timer started at Block 680), the example method 660 (1) removes the downlink data packet from its buffer (or marks the downlink data packet for removal from its buffer, or marks the buffer location storing the downlink data packet for overwrite) (Block 690), and (2) multicasts a further acknowledgement to at least the secondary BS(es) (Block 695). (Although not shown, the timer should be stopped. The timer may be reset when a next downlink packet is buffered.) If, on the other hand, it is determined that the second receipt acknowledgement was not received from the primary BS within the predetermined time period from the time the gateway device multicast the downlink data packet (middle branch of Event 665), the example method 660 re-multicasts the downlink data packet towards the UE via the multicast tree. (Block 685) Although not shown in FIG. 6C, if a second receipt acknowledgment is not receive after a further time, it may be assumed that all connections to the UE are lost and the GW may signal this to the BSs of the multicast tree.

Referring back to block 695, assume that the further acknowledgment is multicast to at least the secondary BS(es), Referring to FIG. 6B, responsive to receiving the further acknowledgement from the GW by the secondary BS (right branch of Event 625), the example method 620 removes the downlink data packet from its downlink bearer buffer. (Block 655) (Recall block 640.)

§ 4.4 Uplink Traffic

Uplink traffic is transmitted over the air from the UE to the primary BS. At the primary BS, the uplink traffic waits in the uplink bearer buffer before eventually being transmitted to the FWB-GW. The FWB-GW will then forward the traffic to the 5th Generation Core Network (5G-CN).

FIGS. 7A-7C are flow diagrams of example methods 700, 720 and 740 for uplink packet processing that may be performed by the UE, by the primary BS, and by the GW, respectively, consistent with the present description. In the following example, it is assumed that the uplink packet needs to traverse the BS and the GW in order to reach the core network (although there are edge cases in which this need not occur). Referring first to FIG. 7A, assume that the UE wants to transmit an uplink packet. (Event 705) In response, the example method 700 transmits wirelessly, the uplink data packet to the primary BS. (Block 710) Referring next to FIG. 7B, assume that the primary BS receives the uplink data packet from the UE. (Event 725) Responsive to receiving the uplink data packet, the example method 720 transmits the uplink data packet to the GW. Finally, referring to FIG. 7C, assume that the GW receives the uplink data packet. (Event 745) Responsive to receiving the uplink data packet, the example method 740 transmits the uplink data packet to a transport network. (Block 750)

§ 4.5 BS Discovery and Add Procedures

Following the initial access, the UE may (and likely will) discover BSs in the FWB area (e.g., via cell search or measurement report). Even though the UE is not connected to those discovered (e.g., as part of a process running in the background, or on demand) BSs, it might keep track of them in order to be able to add them later efficiently in the event that it loses an existing connection. In a K-connectivity scenario, the UE initiates a "BS add" procedure with a discovered BS in the event that it is connected to less than K BSs. During the BS add procedure, the UE sends a connection request to the selected discovered BS. Upon accepting the UE request, the discovered BS adds the UE ID to its AFD, and thereby becomes a secondary BS for the UE.

§ 4.5.1 Multicast Tree Updates

In an example FWB system consistent with the present description, downlink traffic is not multicast to multiple UEs, but rather, to multiple BSs serving a given UE. As noted above, after the UE enters the FWB Area and connects to its serving BS, the FWB-GW builds a multicast tree for this UE. Moreover, whenever a UE establishes a connection with a new BS (that is, discovers and adds a new BS), the multicast tree should be updated. As these updates will occur significantly more often in the blockage driven cellular networks, it is important that the multicast tree reconfiguration is done in a timely manner, especially if it is desired to preserve bandwidth, computational, and/or storage resources. (For example, if a BS that is no longer one of the K best remained in the multicast tree for a little while, it would just discard packets for a UE for which it doesn't have the UE ID, but this would waste bandwidth and/or other resources.) In addition to delay constraints, the multicast tree algorithm should account for the capacity constraints of the BSs in the FWB Area and help achieving load balancing.

§ 4.6 Handover

Figure 2:
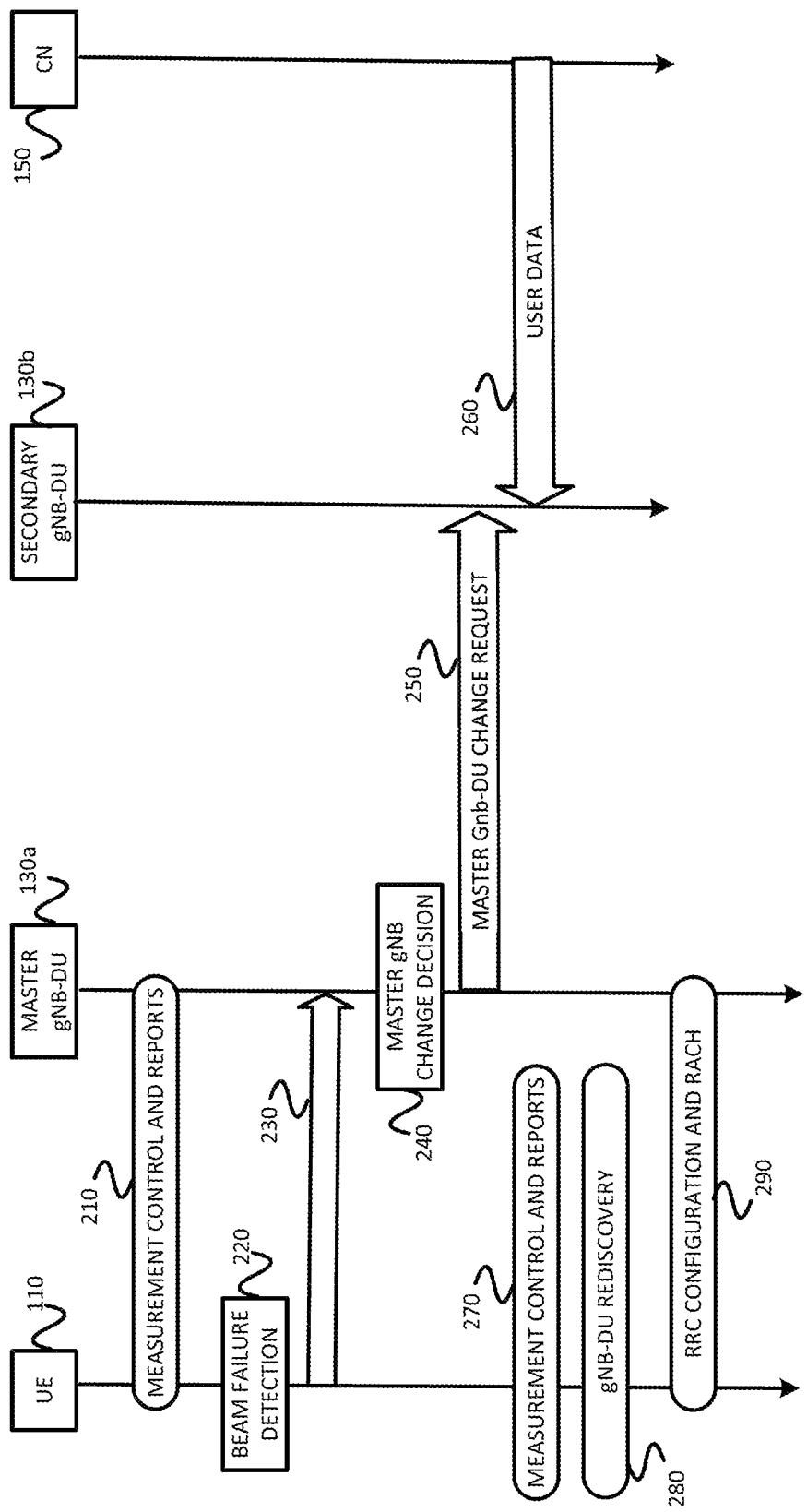
FIG. 2 is a communications diagram illustrating conventional (3GPP) handover.
Figure 3:
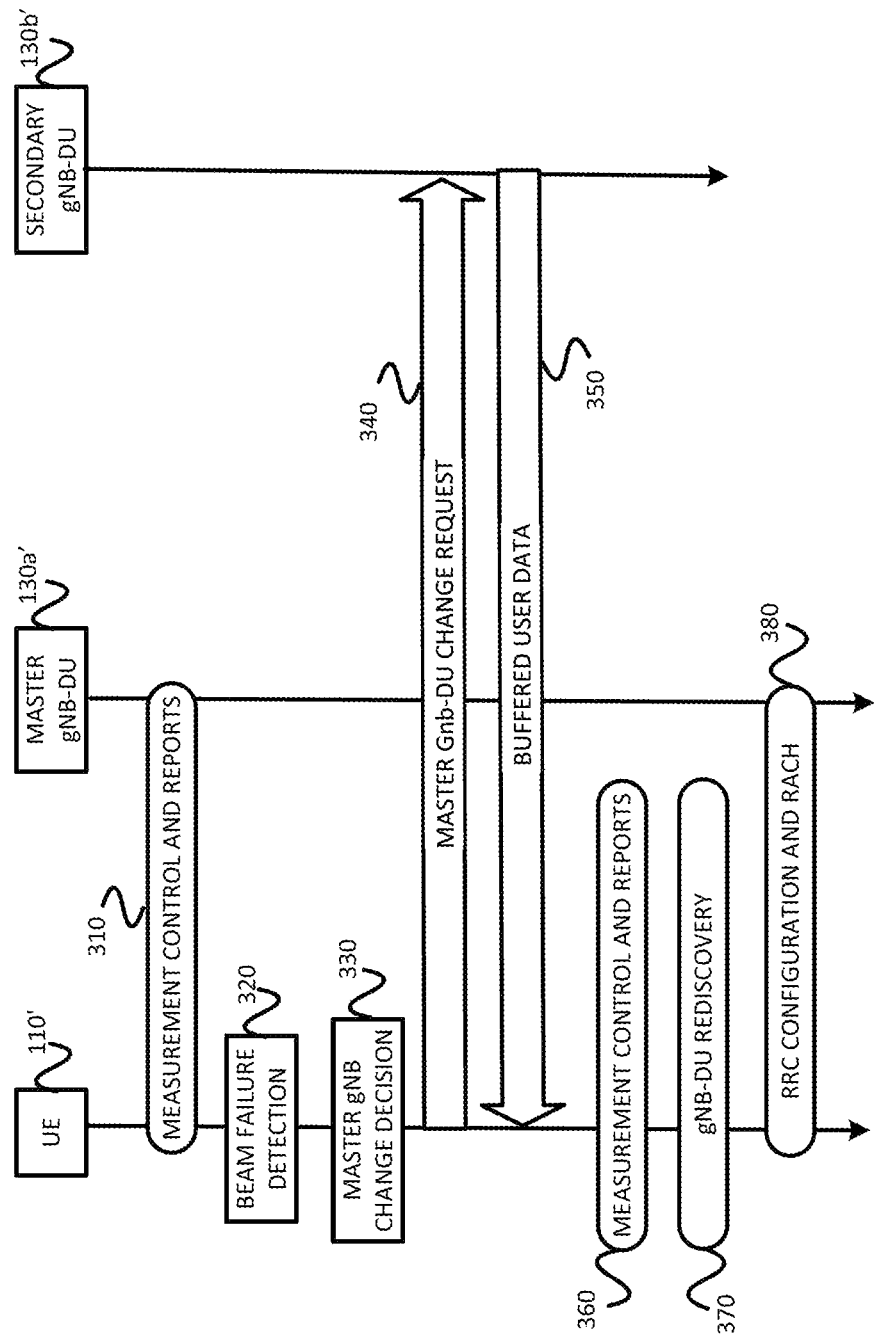
FIG. 3 is a communications diagram illustrating handover consistent with the present description.

The example FWB consistent with the present description offers substantial benefits over the 3GPP proposal in case of handover. (Recall, e.g., FIG. 2.) Referring to FIG. 3, in the example methods consistent with the present description, a UE 110' simultaneously maintains connections with multiple BSs 130a', 130b'. However, as discussed earlier, the UE 110' receives traffic from only one BS 130a' at any time, while it

110' checks the connection(s) to its secondary BS(s) (only one 130b' shown) via heartbeat signals. If the connection to a secondary BS 130b' is compromised (e.g., due to either blockage or UE roaming), the UE 110' will try to establish a connection with one of the discovered BSs (not shown) via the BS add procedure (as discussed previously in § 4.5). If the connection to the primary BS 130a' is compromised (e.g., due to either blockage or UE roaming), the UE 110' can quickly request data plane connection from one of the secondary BSs 130b'. (310, 320, 330 and 340) The selected secondary BS 130b' performs a lookup action and if it finds the UE ID, it accepts the UE 110' request 340 for data plane connection. Then the UE 110' can initiate a BS add procedure to obtain a connection to a discovered BS from the FWB area, as discussed in § 4.5 above, in order to maintain an adequate degree of connectivity. As can be understood by comparing FIG. 3 with FIG. 2, handover to a new primary BS occurs relatively quickly, and any buffered downlink data can be sent from the new primary base station to the UE immediately.

Figure 8:
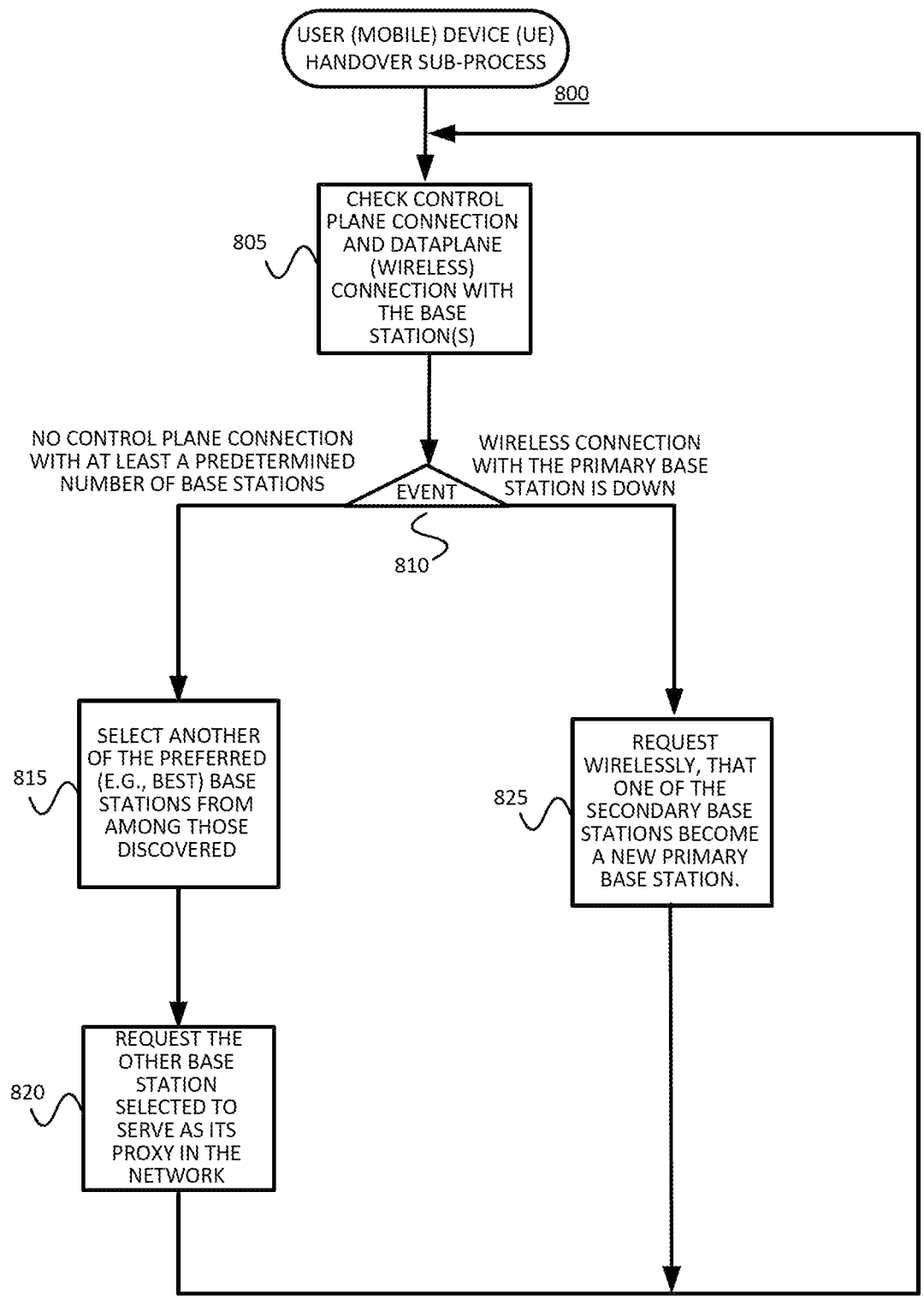
FIG. 8 is a flow diagram of an example handover sub-method that may be performed by user equipment consistent with the present description.

FIG. 8 is a flow diagram of an example add and handover method 800 that may be performed by UE consistent with the present description. The example method 800 determines whether or not is has control plane connection with at least the predetermined number of base stations. (Block 805) Responsive to a determination that the user equipment device does not have control plane connection with at least the predetermined number (e.g., K) of base stations (left branch of Event 810), the example method 800 (1) selects another of the preferred (e.g., best) base stations from among those discovered (Block 815), and (2) requests the other base station selected to serve as its proxy in the network (Block 820). Responsive to a determination that a wireless connection with the primary base station is down (e.g., due to a link failure) (right branch of Event 810), the example method 800 requests wirelessly, that one of the secondary base stations become a new primary base station. (Block 825)

§ 4.6.1 Example Operations of Example FWB Implementation

Figure 9B:
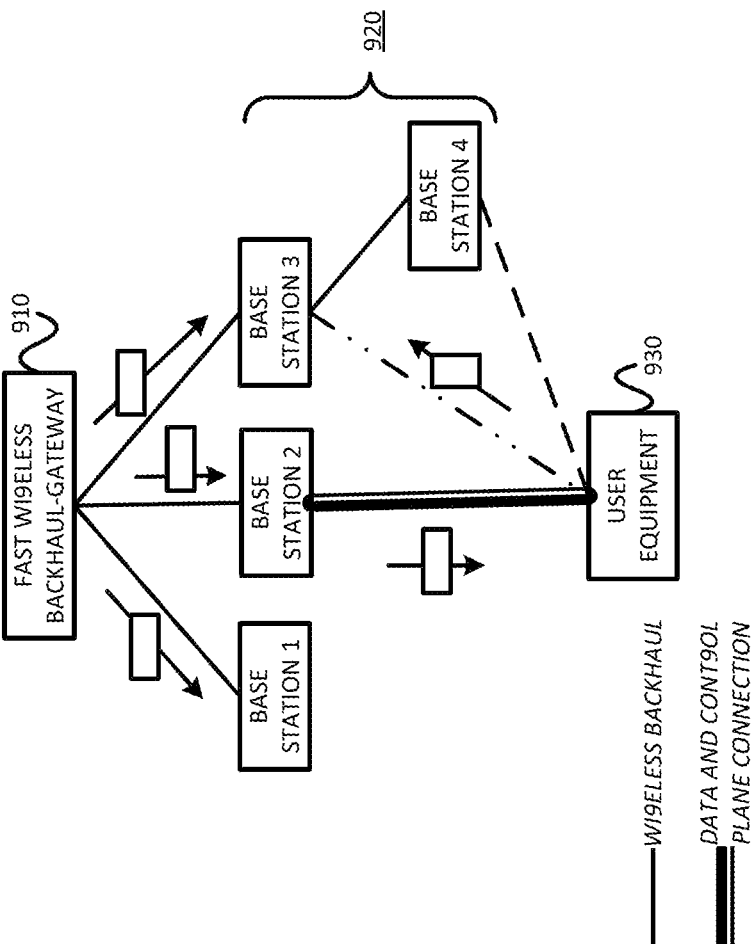
FIGS. 9A and 9B illustrate an example of a handover procedure in an example network consistent with the present description.
Figure 9A:
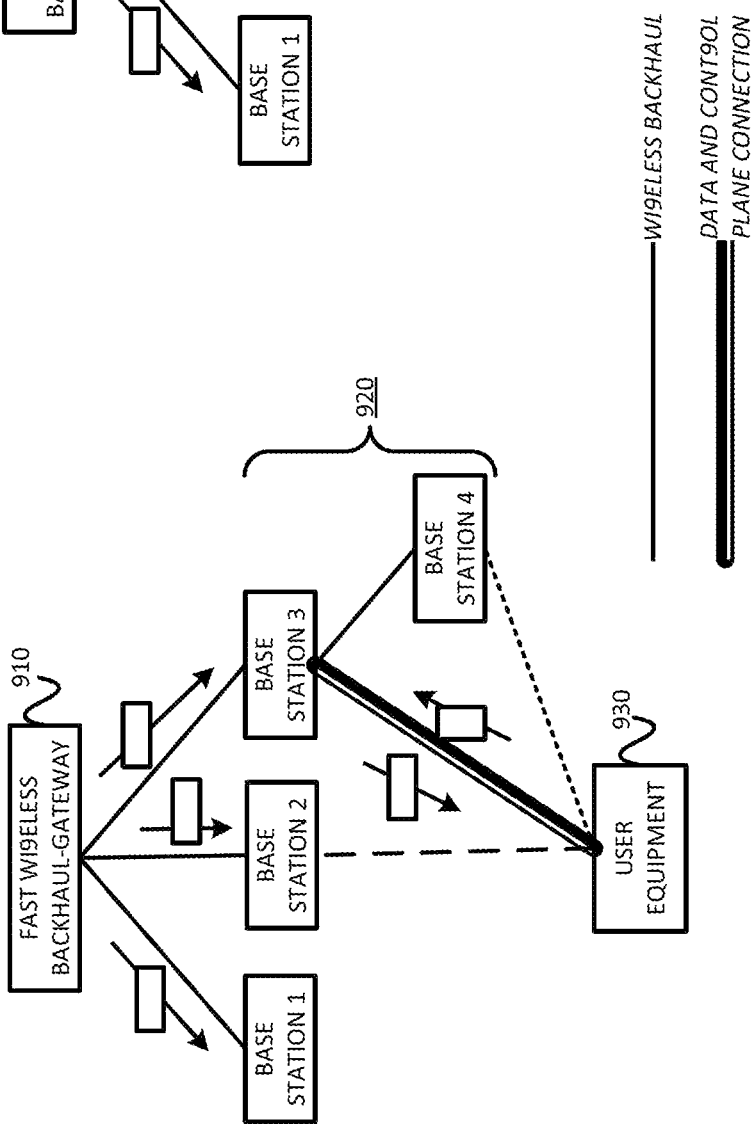

An example of a handover procedure in the FWB network is depicted in FIGS. 9A and 9B. In this example, there are four BSs in the FWB area 920 and the UE 930 is capable of dual (that is, K=2) connectivity. Referring first to FIG. 9A, the UE 930 originally has a data (and control) plane connection with BS 3, but only has a control plane connection with BS 2. Therefore, BS 3 is the primary BS and BS 2 is a secondary BS.

Referring next to FIG. 9B, assume that a mobile blocker will eventually terminate the data plane connection between the UE 930 and BS 3. As shown, BS 2 can immediately become the new primary BS for the UE 930. Further, the UE 930 can perform a BS add procedure with BS 4 since it was previously discovered, but not yet connected. (Compare connections UE 930 and BS 4 in FIGS. 9A and 9B.) As this simple example illustrates, the UE 930 reestablishes dual (i.e., K=2) connectivity in a fast and efficient way. Further, this is clearly scalable for situations in which the UE 930 is capable of higher (K>2) connectivity.

§ 4.7 Link Failure Scenarios

Wireless backhaul links are vulnerable to blockage, e.g., due to moving objects such as vehicles, due to seasonal changes (foliage), or due to infrastructure changes (new buildings). Also, traffic variations can create uneven load distribution on wireless backhaul links leading to local link or node congestion. Three different types of link failure in an example FWB network are considered in §§ 4.7.1-4.7.3 below.

§ 4.7.1 BS-UE Link Failure

This type of link failure occurs in networks with either a wired or a wireless backhaul. In the event of a BS-UE link failure, the UE should initiate a BS add procedure as discussed in § 4.5 above. For example, in FIG. 9B, a BS-UE link failure occurred between the UE 930 and BS 3 due to a blocker arrival. Having had already discovered BS 4, the UE sends it a connection request since it has less than K control plane connections. After BS 4 accepts the request, it adds the UE's ID to its AFD, and a connection between the two is established.

§ 4.7.2 BS-BS Link Failure

This link failure can happen in a link between two BSs of the FWB network, where neither of them is the FWB-GW. In this scenario, the UE does not need to take corrective action immediately because its proxy BS (that is, a parent BS, which may be the primary BS or a secondary BS) can establish a new backhaul link instead. For example, referring to FIG. 9B, assume that the UE 930 is connected to BS 4. If a blocker arrives between BS 3 and BS 4, a BS-BS link failure occurs. In this case, before the UE 930 tries to establish a connection with a new BS, BS 4 can instead establish a different path to the FWB-GW (e.g., through BS 2, or through BS 3). In this example, the UE 930 experiences almost no service interruption (taking into consideration any time needed to reconfigure a new path).

§ 4.7.3 FWB-GW-BS Link Failure

This link failure can happen in a link between the FWB-GW 910 and a BS 920. For example, referring to FIG. 9A, this type of failure can occur if a blocker arrives in the link between the FWB-GW 910 and BS 2. In this example, to recover the connection, either the UE 930 will establish a connection with a different BS, or BS 2 will reach FWB-GW through a different path (depending on the number of hops, the distance between the BSs, the availability of BSs, the capacity of BSs, etc.) As the number of nodes in the FWB networks increases, the number of routing options increases as well. The recovery action should occur for both the primary BS and any secondary BS(s). Even though no traffic is transmitted via the secondary BS, a path between the secondary BS(s) and the FWB-GW should always be available so that high reliability is maintained.

§ 4.8 Example Apparatus

Figure 10:
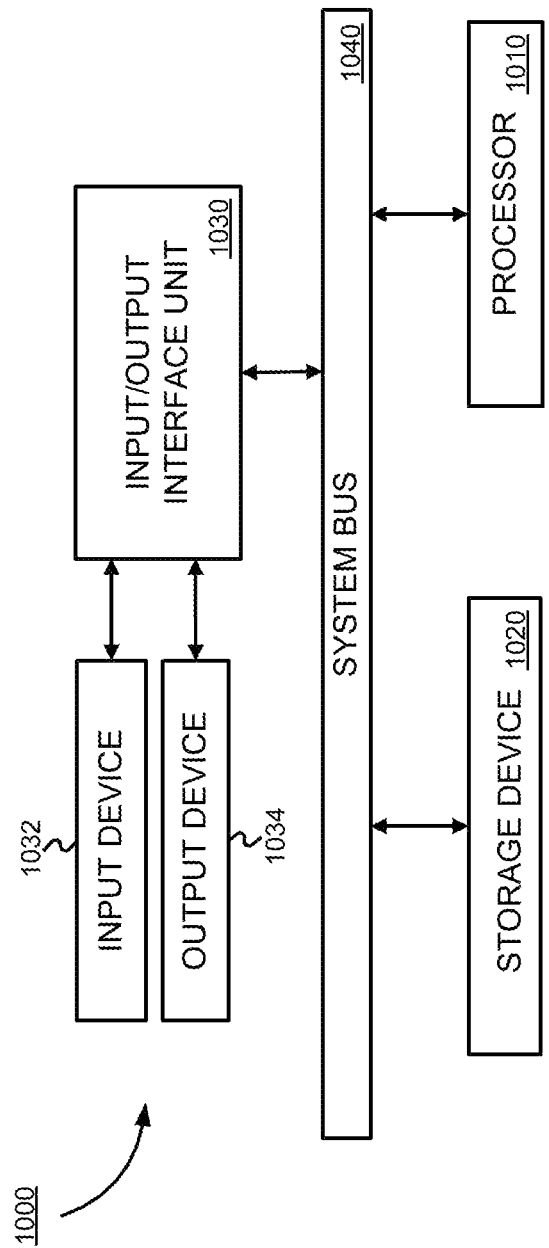
FIG. 10 is a diagram of apparatus that may be used to implement one or more components used in a system consistent with the present description.

Embodiments consistent with the present invention may be implemented on an example system 1000 as illustrated on FIG. 10. FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the invention.

In some embodiments consistent with the present invention, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in a laptop computer, desktop computer, a server, a tablet computer, a mobile phone, or any device that has computing capabilities and that can perform the foregoing method(s).

§ 4.9 Alternatives

Referring back to FIG. 1, in some example implementations, each of the at least two base stations 130 are wirelessly connected with one another. In some example implementations, at least one of the base stations 130 is wirelessly connected with the gateway device 140.

Although some example embodiments described a single primary base station and one or more secondary base stations, in an alternative example embodiment, the multicast of a downlink packet is extended beyond the base stations to a simultaneous transmission of the multicast downlink data to a UE. That is, in this alternative example, two or more copies the same downlink data may be sent (via two or more base stations) over the wireless link(s) to the UE at the same time. The UE would only tune in to one of them at a time, but could switch to (any of) the other data stream in the event of a blockage. More generally, there can be a set of more than one "primary" base stations (referred to as a "primary group"), which could be all K of the best base stations, or some subset of the K best base stations. Although this alternative embodiment may sacrifice some wasted bandwidth, handover delay can be reduced. Further, the downlink data packet(s) need not be buffered (Recall block 640 of FIG. 6B), or less buffering would be needed. This is because the downlink data should be available in a parallel transmission stream from another base station of the primary group of base stations.

§ 4.10 Conclusions

An FWB implementation consistent with the present description advantageously provides one or more of the following advantages. First, by providing "connection-less connectivity," FWB eliminates the need for the core network to be involved in establishing links between individual BSs and the UE.

Second, by providing resiliency to blockage, the UE may roam freely among BSs in an FWB coverage area, with an extremely fast and efficient handover process. Multi-connectivity allows very fast switching if the data plane connection is interrupted. Even in case of a backhaul failure, the UE experiences almost no service interruption.

Third, the FWB architectures described includes a FWB Gateway as a natural point for deployment of edge services resources such as, for example, mobile edge computing and caching.

What is claimed is:

1. For use in a network including a gateway device, at least two base stations, and a user equipment device, a computer-implemented method comprising:
   a) conducting, by the user equipment device, a cell search procedure to discover base stations within its wireless range;
   b) selecting, by the user equipment device, a predetermined number (K) of preferred base stations among those discovered, wherein K is at least two;
   c) requesting wirelessly, by the user equipment device, that each of the K preferred base stations selected serve as its proxies in the network;
   d) responsive to receiving a request from the user equipment device, determining, by each of the K preferred base stations selected, whether or not to accept the received request;
   e) for each of the K preferred base stations selected, responsive to accepting the received request,
      1) adding, by the preferred base station selected, an identifier of the user equipment device to an address filter database, and
      2) sending to the gateway device wirelessly, by the preferred base station selected, a control signal which indicates that the user equipment device is now being served by the preferred base station selected; and
   f) responsive to receiving a plurality of control signals from a plurality of the preferred base stations selected, building a multicast tree for the user equipment device via the plurality of preferred base stations selected.

2. The computer-implemented method of claim 1, wherein one of the preferred base stations selected is identified as a primary base station, and wherein each of the other of the preferred base stations selected is identified as a secondary base station, the computer-implemented method further comprising:
  maintaining a control plane wireless connection between the user equipment device and each of the preferred base stations selected; and
  maintaining a data plane wireless connection only between the user equipment device and the primary base station.

3. The computer-implemented method of claim 2, further comprising:
  receiving, by the gateway device, a downlink data packet destined for the user equipment device;
  responsive to receiving the downlink data packet destined for the user equipment device,
    1) multicasting the downlink data packet towards the user equipment device via the multicast tree,
    2) buffering the downlink data packet, and
    3) starting a timer or counter;
  for each of the preferred base stations selected, responsive to receiving from the gateway device, the downlink data packet destined for the user equipment device, determining whether or not the preferred base station selected is the primary base station;
  responsive to a determination that the preferred base station selected is the primary base station, sending the downlink data packet received to the user equipment device wirelessly, and
    otherwise, responsive to a determination that the preferred base station selected is not the primary base station, storing the downlink data packet received in a downlink bearer buffer;
  receiving, by the user equipment device, the downlink data packet from the primary base station; and
  responsive to receiving the downlink data packet from the primary base station, sending wirelessly, by the user equipment device, a receipt acknowledgement to the primary base station.

4. The computer-implemented method of claim 3, further comprising:
  responsive to receiving, by the primary base station, the receipt acknowledgement from the user equipment device, sending, by the primary base station, a second receipt acknowledgement to the gateway device;
  determining, by the gateway device, whether or not the second receipt acknowledgement is received from the primary base station within a predetermined time period from the time the gateway device multicast the downlink data packet; and
  responsive to determining that the second receipt acknowledgment was received from the primary base station within the predetermined time period from the time the gateway device multicast the downlink data packet,
    1) removing, by the gateway device, the downlink data packet from its buffer, or marking the downlink data packet for removal from its buffer, or marking the buffer location storing the downlink data packet for overwrite, and
    2) multicasting, by the gateway device, a further acknowledgement to at least the secondary base stations, and
  otherwise, responsive to determining that the second receipt acknowledgement was not received from the primary base station within the predetermined time period from the time the gateway device multicast the downlink data packet, re-multicasting the downlink data packet towards the user equipment device via the multicast tree.

5. The computer-implemented method of claim 4, further comprising:
  for each of the secondary base stations, responsive to receiving the further acknowledgement from the gateway device, removing, by the secondary base station, the downlink data packet from its downlink bearer buffer.

6. The computer-implemented method of claim 2, further comprising:
  determining, by the user equipment device, whether or not is has control plane connection with at least the predetermined number of base stations; and
  responsive to a determination that the user equipment device does not have control plane connection with at least the predetermined number of base stations,
    1) selecting, by the user equipment device, another of the preferred base stations from among those discovered, and
    2) requesting, by the user equipment device, the other base station selected to serve as its proxy in the network.

7. The computer-implemented method of claim 2, further comprising:
  determining, by the user equipment device, that a wireless connection with the primary base station is down; and
  responsive to determining that the wireless connection with the primary base station is down, requesting wirelessly, by the user equipment device, that one of the secondary base stations become a new primary base station.

8. The computer-implemented method of claim 2, further comprising:
  transmitting wirelessly, from the user equipment device, an uplink data packet to the primary base station;
  receiving, by the primary base station, the uplink data packet;
  responsive to receiving, by the primary base station, the uplink data packet, transmitting the uplink data packet to the gateway device;
  receiving, by the gateway device, the uplink data packet; and
  responsive to receiving, by the gateway device, the uplink data packet, transmitting the uplink data packet to a transport network.

9. The computer-implemented method of claim 1 wherein each of the at least two base stations are wirelessly connected with one another.

10. The computer-implemented method of claim 1 wherein at least one of the base stations is wirelessly connected with the gateway device.

11. The computer-implemented method of claim 1, wherein a set of at least two of the preferred base stations selected is identified as a primary base station group, the computer-implemented method further comprising:
  maintaining a control plane wireless connection between the user equipment device and each of the preferred stations selected; and
  maintaining a data plane wireless connection only between the user equipment device and each base station in the primary base station group.

12. The computer-implemented method of claim 11, further comprising:
  receiving, by the gateway device, a downlink data packet destined for the user equipment device;

responsive to receiving the downlink data packet destined for the user equipment device, multicasting the downlink data packet towards the user equipment device via the multicast tree;

for each of the preferred base stations selected, responsive to receiving from the gateway device, the downlink data packet destined for the user equipment device, determining whether or not the preferred base station selected belongs to the primary base station group;

responsive to a determination that the preferred base station selected belongs to the primary base station group, sending the downlink data packet received to the user equipment device wirelessly; and receiving, by the user equipment device, the downlink data packet from one of the base stations belonging to the primary base station group to which the user equipment device is tuned.

13. The computer-implemented method of claim 12, further comprising:

responsive to receiving the downlink data packet, sending wirelessly, by the user equipment device, a receipt acknowledgement to the one of the base stations belonging to the primary base station group to which the user equipment device is tuned.

14. A base station comprising:
a) at least one processor; and
b) a non-transitory, computer-readable storage device storing program instructions which, when executed by the at least one processor, cause the at least one process to perform a method including
1) responsive to receiving a proxy request from a user equipment device, determining whether or not to accept the received request;
2) responsive to accepting the received proxy request,
A) adding an identifier of the user equipment device to an address filter database, and
B) sending to a gateway device wirelessly, a control signal which indicates that the user equipment device is now being served by the base station whereby, responsive to receiving a plurality of control signals from a plurality of base stations, the gateway device will build a multicast tree for the user equipment device via the base station and at least one other of a plurality of base stations that have accepted a request from the user equipment device to serve as its proxy in the network.

15. The base station of claim 14, wherein the method further includes
3) determining whether the base stations is either (A) a primary base station or (B) a secondary base station, and
4) responsive to determining that the base station is a primary base station,
maintaining both (1) a data plane wireless connection only between the user equipment device and the base station and (2) a control plane wireless connection between the user equipment device and the base station, and
otherwise, responsive to determining that the base station is a secondary base station,
maintaining a control plane wireless connection between the user equipment device and the base station, but not a data plane wireless connection.

16. The base station of claim 15, wherein the method further includes,
5) responsive to receiving from the gateway device, a downlink data packet destined for the user equipment device via the multicast tree, determining whether or not the base station is the primary base station, and
6) responsive to a determination that the base station is the primary base station,
sending the downlink data packet received to the user equipment device wirelessly, and
otherwise, responsive to a determination that the base station is not the primary base station,
storing the downlink data packet received in a downlink bearer buffer.

17. The base station of claim 16, wherein the base station is a primary base station, the method further includes
7) responsive to receiving by the base station, the receipt acknowledgement from the user equipment device, sending, by the station, a second receipt acknowledgement to the gateway device.

18. The base station of claim 16, wherein the base station is a secondary base station, the method further including
7) responsive to receiving a further acknowledgement from the gateway device, removing, by the base station, the downlink data packet from its downlink bearer buffer.

19. A non-transitory computer-readable storage medium storing processor-executable instructions which, when executed by at least one processor in a network including a gateway device, at least two base stations, and a user equipment device, cause the at least one processor to perform a method comprising:
a) conducting, by the user equipment device, a cell search procedure to discover base stations within its wireless range;
b) selecting, by the user equipment device, a predetermined number (K) of preferred base stations among those discovered, wherein K is at least two;
c) requesting wirelessly, by the user equipment device, that each of the preferred base stations selected serve as its proxies in the network;
d) responsive to receiving a request from the user equipment device, determining, by each of the preferred base stations selected, whether or not to accept the received request;
e) for each of the preferred base stations selected, responsive to accepting the received request,
1) adding, by the preferred base station selected, an identifier of the user equipment device to an address filter database, and
2) sending to the gateway device wirelessly, by the preferred base station selected, a control signal which indicates that the user equipment device is now being served by the preferred base station selected; and
f) responsive to receiving a plurality of control signals from a plurality of preferred base stations selected, building a multicast tree for the user equipment device via the plurality of preferred base stations selected.

20. The non-transitory computer-readable medium of claim 19, wherein one of the preferred base stations selected is identified as a primary base station, and wherein each other of the preferred base stations selected is identified as a secondary base station, the method further comprising:
maintaining a control plane wireless connection between the user equipment device and each of the preferred base stations selected; and
maintaining a data plane wireless connection only between the user equipment device and the primary base station.

* * * * *